United States Patent
Quiney

[15] 3,666,058
[45] May 30, 1972

[54] INTERNAL SHOE DRUM BRAKES
[72] Inventor: Kenneth Maurice Quiney, Warwickshire, England
[73] Assignee: Girling Limited, Birmingham, England
[22] Filed: Feb. 24, 1970
[21] Appl. No.: 13,596

[30] Foreign Application Priority Data
Mar. 1, 1969  Great Britain....................11,032/69
Oct. 18, 1969  Great Britain....................51,267/69

[52] U.S. Cl....................................188/106 A, 188/79.5 R
[51] Int. Cl.....................................F16d 65/22, F16d 65/42
[58] Field of Search...................188/79.5 R, 79.5 K, 79.5 P, 188/106 A, 106 F, 196 M

[56] References Cited
UNITED STATES PATENTS
2,292,017  8/1942  Smith..............................188/79.5 B
2,374,536  4/1945  Goepfrich........................188/106 A Primary Examiner—Duane A. Reger
Attorney—Scrivener, Parker, Scrivener and Clarke

[57] ABSTRACT

In a shoe drum brake a mechanical actuator for separating adjacent shoe ends includes a lever pivotally connected to a shoe and adapted to act on the other shoe through a strut which is chordal with respect to the axis of the brake. In the off position of brake the lever is held in a first retracted position spaced from a fully retracted position by a back stop. The back stop is adapted to be manipulated externally of the brake to permit the lever to move into the fully retracted position under the influence of pull-off springs whereby the braking clearances are increased.

19 Claims, 8 Drawing Figures

Patented May 30, 1972  3,666,058

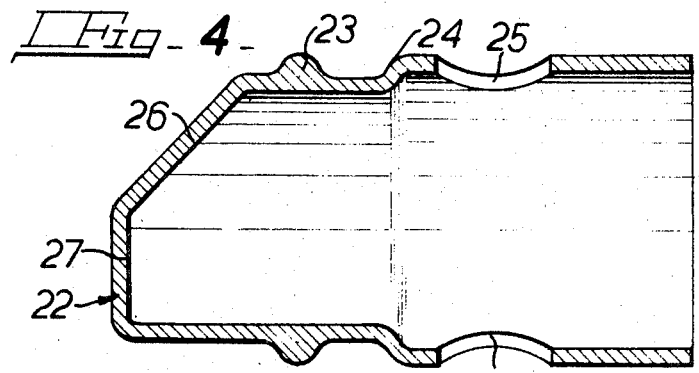
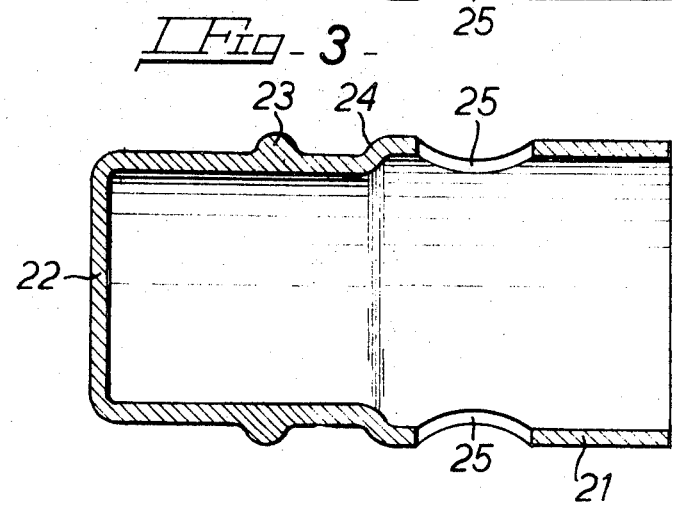
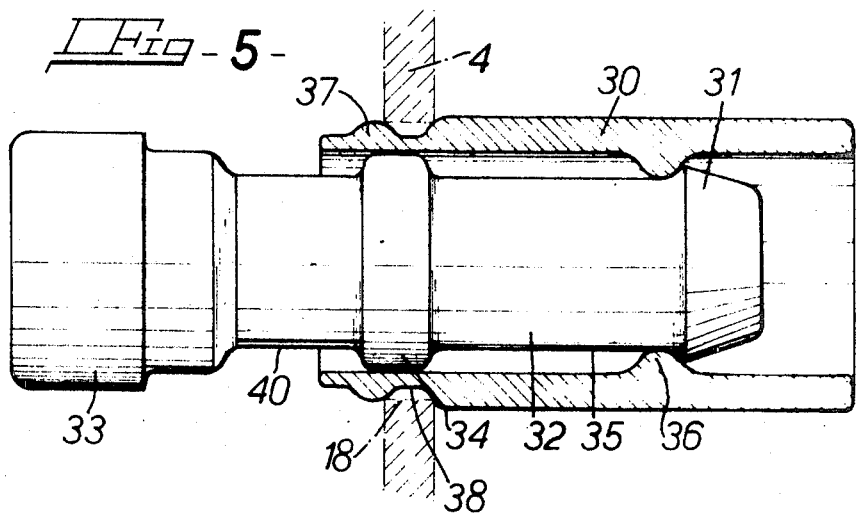

INTERNAL SHOE DRUM BRAKES

SPECIFIC DESCRIPTION

This invention relates to internal shoe drum brakes of the kind in which arcuate shoes carrying friction linings for engagement with a rotatable drum are mounted on a stationary back plate, and adjacent shoe ends are separated in the application of the brake by a mechanical actuator linkage including an angularly movable lever pivotally connected at one end to one shoe and coupled at the other to applying means, such as inextensible flexible cable, and a strut acting between the lever at an intermediate point in its length and the other shoe, means for adjusting automatically the clearance between the shoes and brake drum to compensate for wear of the friction linings being incorporated in the mechanical actuator linkage.

In internal shoe drum brakes of this kind it frequently occurs that, in use, at least one of the brake shoes wears a groove into the drum. Difficulty is thus experienced in removing the drum to replace the brake shoes as the shoes can not be retracted from the drum due to the presence of the automatic adjusting means or the inaccessibility of the automatic adjusting means from outside the brake.

According to our invention in an internal shoe drum brake of the kind set forth in the off position of brake the lever co-operates with a back stop which determines the braking clearances between the brake shoes and the drum and which is constructed and arranged so that the lever is held in a first retracted position spaced from a fully retracted position, and the back stop is adapted to be manipulated externally of the brake to permit the lever to move from the said first retracted position into the said fully retracted position whereby the braking clearance are increased.

By increasing the braking clearance facilitates removal of the rotatable drum from the brake for removal and replacement of the brake shoes.

Conveniently the back stop is in the form of an insert assembly which projects into the brake through an opening in the back plate in which it is mounted and engages at its inner end with the angularly movable lever.

To increase the braking clearance the insert may simply be removed from the brake.

In an alternative construction the end of the insert assembly which engages with the lever is of tapered or other shaped form so that the braking clearances are increased by rotating the insert assembly in its mounting in the back plate.

Where the insert assembly comprises a single member of fixed axial length, the effective distance by which the insert projects into the brake to determine the first retracted position of the lever is constant. Thus it is not possible to determine whether the mechanical actuator linkage is initially adjusted correctly since the lever might be held tightly against the inner end of the backstop or it might simply be touching the backstop.

This difficulty is overcome by constructing the insert assembly as a telescopic assembly comprising an outer sleeve mounted in an opening in the back plate in which works a piston provided at its inner end for engagement with the lever a head of a diameter greater than the internal diameter of the sleeve, and the head is initially spaced from the adjacent inner end of the sleeve and is moved towards the sleeve during initial adjustment of the mechanical actuator linkage until the head engages with the inner end of the sleeve to define the desired initial adjustment of the mechanical actuator linkage.

The inner end of the sleeve thus forms a stop limiting movement of the head towards the sleeve, indicating the point at which the desired adjustment is reached. An engagement between the lever and the head, when in this position, determines the first retracted position of lever and, to increase the braking clearances, the telescopic assembly is simply removed from the brake.

Embodiment of our invention are illustrated in the accompanying drawings in which:

FIG. 3 is a longitudinal section of a backstop for incorporation in the brake illustrated in FIGS. 1 and 2;

FIG. 4 is a longitudinal section of a modified form of back stop;

FIG. 5 is a longitudinal section of a back stop in the form of a telescopic assembly for incorporation in the brake illustrated in FIGS. 1 and 2 with the telescopic assembly in an initial extended position;

Figure 1:
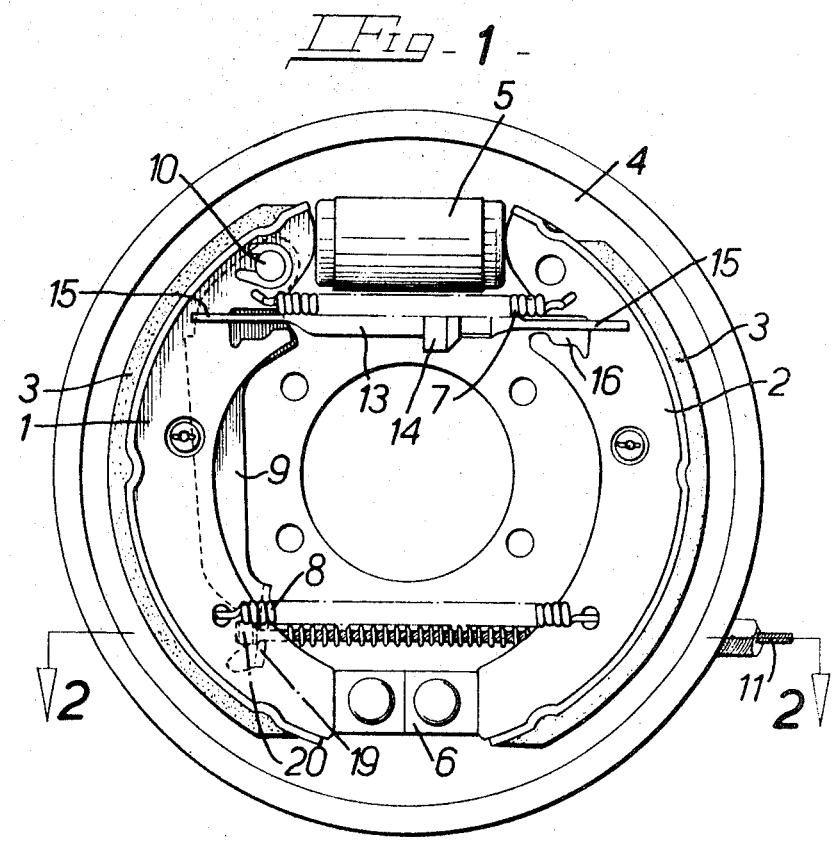
FIG. 1 is an elevation of an internal shoe drum brake.
Figure 2:
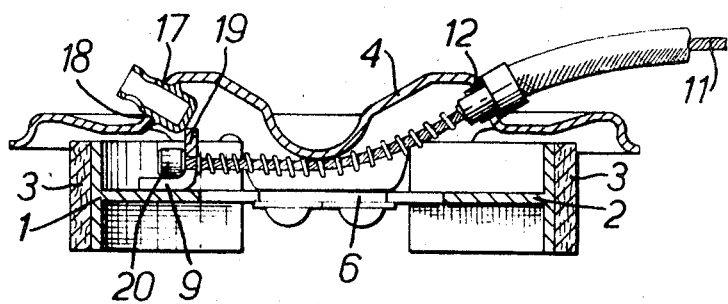
FIG. 2 is a part section on the line 2—2 of FIG. 1.

The internal shoe drum brake illustrated in FIGS. 1 and 2 of the drawings comprises a pair of arcuate shoes 1 and 2 carrying friction linings 3 for engagement with a rotatable drum (not shown). The shoes 1, 2 are mounted on a stationary back plate 4 and, for normal service braking, are adapted to be separated at adjacent ends by a double ended hydraulic piston and cylinder assembly 5 mounted on the back plate 4 between that pair of shoe ends. At their opposite ends the shoes 1, 2 fulcrum on a stationary abutment 6 secured to the back plate which takes the torque on the shoes when the brake is applied.

In the off position of brake the shoes are held out of engagement with drum by pull-off springs 7 and 8 connected between the shoe webs.

For emergency or parking braking the brake is applied mechanically by a mechanical actuator. The mechanical actuator comprises a lever 9 pivotally connected at one end to the web of the trailing shoe 1 at a position adjacent to the hydraulic actuator 5, by means of a pivot pin 10. The free end of the lever 9 is coupled to a cable 11 which enters the brake through an opening 12 in the back plate, and at an intermediate point in its length the lever 9 acts on one end of a strut 13 of which the other end engages with the web of the leading shoe 2. The effective length of the strut 13 is adjustable by automatic adjustment means 14 to take up the braking clearance and compensate for wear of the friction linings 3. Opposite ends of the strut 13 are provided with bifurcated portions 15 which straddle the webs of the shoes, the bases of the bifurcated portions 15 engaging with an edge of the lever 9 and with the base of a slot 16 in the web of the trailing shoe 2, respectively.

The lever 9 is held away from a fully retracted position by means of a back stop in the form of an insert assembly 17 which extends into the brake through an opening 18 in the back plate 4. The inner end of the insert assembly 17 engages with the adjacent outer face of an abutment 19 integral with, and lying at right angles to the plane of the lever 9 and against which abuts the inner face of a boss 20 at the free end of the flexible cable 19. The insert assembly may be of any convenient construction.

In the construction shown on an enlarged scale in FIG. 3, the insert assembly comprises a cylindrical sleeve 21 of stepped diameter which is closed at its inner end of lesser diameter by a planar end wall 22 normal to the main axis of the sleeve 21. The sleeve 21 comprises a single member of fixed axial length which is formed from a deformable synthetic plastic material. The sleeve 21 is provided at an intermediate point in its length with an outwardly projecting annular rib 23 which is forced through the opening 18 in the back plate 4. The material of the back plate 4 is clamped between the rib 23 and a shoulder 24 spaced from the rib 23 in a direction away from the end wall 22 and located at a step in the change in diameter in the wall of the sleeve 21. A pair of diametrically opposed openings 25 are provided in the cylindrical wall of the sleeve 21 at a position spaced outwardly from the shoulder 14 and from the back plate 4 when the insert assembly is installed in the brake.

When the sleeve 21 is installed in the brake as described above, the outer face of the planar wall is engaged by the abutment 19 to hold the lever in a first retracted position spaced from a fully retracted position against the force in the pull-off springs 7,8. This position of the lever 9 defines the braking clearances between the friction lining 3 and the brake drum in the "off" position of brake due to the pivotal connection 10 between the lever 9 and the trailing shoe 1, and the strut 13 through which the lever 9 acts on the trailing shoe 2.

When it is desired to remove the brake drum to replace or inspect the brake shoes 1 and 2 the sleeve 21 is simply removed from its engagement in the back plate 4. This can be achieved by passing a rod through the openings 25 in the wall of the sleeve. The lever 9 is then free to move angularly in an outward direction towards the drum about the pin 10 as an axis and into the fully retracted position under the influence of the pull-off springs 7 and 8 whereby the braking clearances between the friction linings 3 and the drum are increased.

FIG. 4 is a longitudinal section through an insert assembly in the form of a sleeve substantially identical with the construction illustrated in FIG. 3 but including a modification and corresponding reference numerals have therefore been used to indicate corresponding parts. In the modified insert assembly illustrated in FIG. 4 the end wall 22 is formed for substantially one-half of its area with a chamfered portion 26 which is inclined with respect to the main axis of the sleeve 21 and the remainder 27 of the end wall 22. Normally the remainder of the end wall 22, which is normal to the main axis of the sleeve, engages with the lever 9 to define the first retracted position spaced angularly from the fully retracted position. By rotating the sleeve 21 in the back plate about its main longitudinal axis the chamfered portion 26 is brought into engagement with the abutment 19 on the lever 9. This permits the lever 9 to move angularly towards the drum and towards the fully retracted position with the result that the clearances between the linings 3 and the drum are increased as described above.

Figure 6:
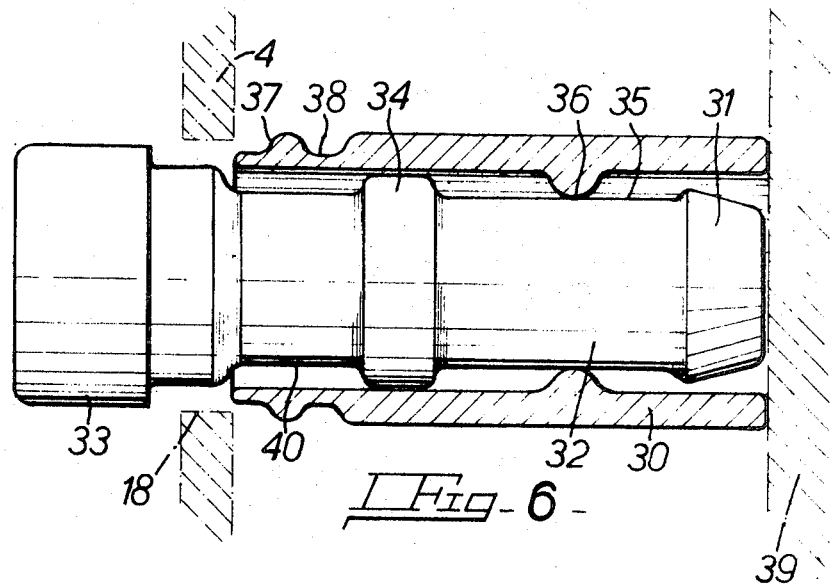
FIG. 6 is a view similar to FIG. 5 but showing the assembly in an intermediate position.
Figure 7:
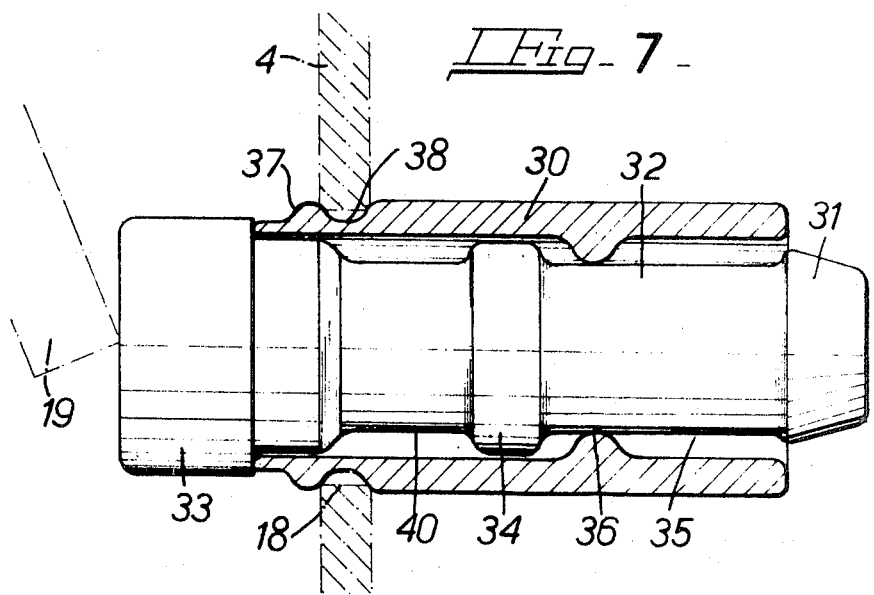
FIG. 7 is a view similar to FIG. 5 but showing the assembly in a final contracted position.

The back stop illustrated in FIGS. 5 to 7 of the drawings is in the form an an insert assembly of telescopic construction. The insert assembly comprises a cylindrical sleeve 30 into which is inserted a tapered nose portion 31 at one end of a piston 32 provided at other other end with an enlarged head 33 of a diameter greater than the internal diameter of the sleeve but less than its external diameter and the diameter of the opening 18 in the back plate 4. The sleeve 30 and the piston 32 are both constructed from a synthetic plastic material and are preferably formed as moldings.

The nose portion 31 is spaced from an annular rib 34 at an intermediate point in the length of the piston 32 by a land 35 of reduced diameter which is a working fit within an internal annular rib 36 integral with the inner surface of the sleeve 30, after the nose portion is force through the rib 36 due to the resilience of the material of the sleeve 30 and the piston 32. This permanently couples together the piston 32 and the sleeve 30 for relative axial sliding movement through a limited range defined by an engagement of the head 33 with the adjacent end of the sleeve 30, and an engagement of the nose portion 31 with the rib 36.

The end of the sleeve 30 against which the head 33 is adapted to abut is formed with a chamfered or otherwise reduced diameter portion 37 leading into an external annular groove 38.

When the sleeve 30 and the piston 32 are coupled together as described above, the back stop is mounted in the opening 18 in the back plate by passing the head 33 through the opening and by the use of a suitable flat tool 39, forcing the adjacent end of the sleeve 30 through the opening, due to the resilience of the material of the sleeve 30, until a position is reached in which the edge portion of the back plate 4 surrounding the opening 18 is received in the annular groove 38 (FIG. 6).

The piston 32 is urged inwardly with respect to the sleeve 30 and relative to the brake to increase the effective length of the assembly within the brake until the nose portion 31 engages with the rib 36 (FIG. 5). Thereafter the adjuster 14 is manipulated manually to bring the abutment 19 on the lever 9 into engagement with the head 33 and is subsequently adjusted further to move the piston 32 outwardly in the opposite direction. This continues until the desired position of adjustment is attained to determine the first retracted position of the lever 9, in which the head 33 is in abutment with the adjacent inner end of the sleeve 30 and is subjected to a predetermined loading from the pull-off springs 7 and 8. That is to say, the desired adjusted position of the lever 9 in the first retracted position is reached when the piston 32 is just prevented from moving axially away from the sleeve in an inward direction.

The piston 32 is provided with a second land 40 located on the side of the rib 34 remote from the land 33 and the rib 34 is a working fit in the bore of the sleeve 30. Thus, the piston 32 is at all times guided in the sleeve 30 at at least two axially spaced points, thereby preventing any tendency for the piston 32 to tilt or move transversely relative to the bore of the sleeve 30, or bind in the bore.

When it is desired to remove the brake drum to replace or inspect the brake shoe the telecopic insert assembly is simply removed from its engagement in the back plate 14 by withdrawing the sleeve 30 and piston 32 outwardly through the opening 18 by the use of a pair of pliers or a similar withdrawal tool. The lever 9 then moves angularly outwardly into the fully retracted position under the influence of the pull-off springs 7 an 8 as described above, whereby the clearances between the shoes 1 and 2, and the drum are increased automatically.

Figure 8:
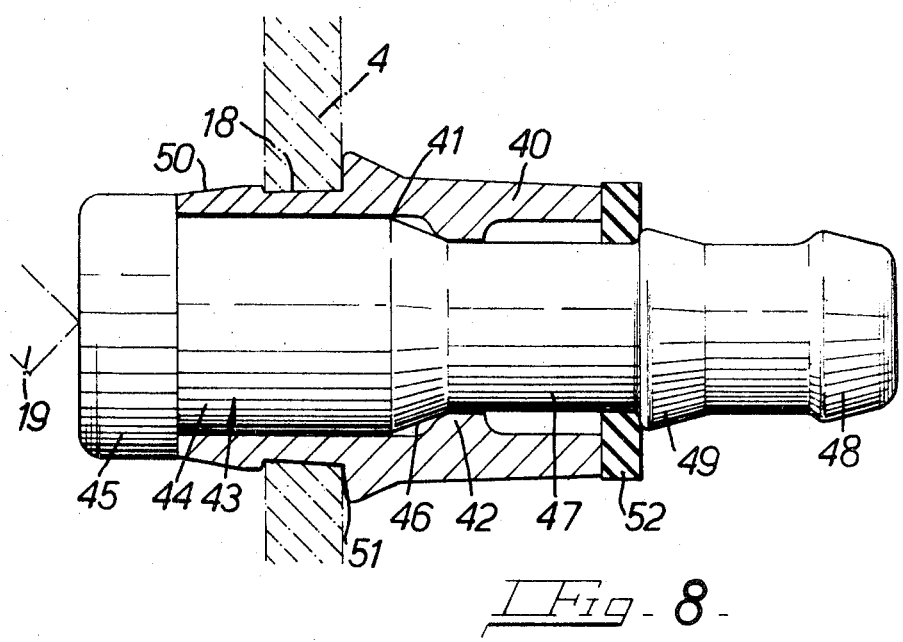
FIG. 8 is a longitudinal section of a telescopic assembly similar to FIGS. 5 to 7 but of modified construction.

The modified backstop of telescopic construction illustrated in FIG. 8 of the drawings comprises a sleeve 40 having a cylindrical through bore 41 of constant diameter provided at a intermediate point in its axial length with inwardly directed radial rib 42.

A piston 43 of a length substantially greater than that of the sleeve 40 comprises a cylindrical portion adapted to work in the bore 41 and provided at one end with an enlarged head 45. At its opposite inner end the portion 44 terminates in an inclined step 46 which leads into a cylindrical portion 47 of a diameter slightly less than the internal diameter of the rib 42. The free end of the cylindrical portion 47 carries a nose portion 48 of a maximum diameter slightly greater than the internal diameter of the rib 42 and a radial rib 49 of a maximum diameter, equal to the maximum diameter of the nose portion 48, is formed in the cylindrical portion 47 at a point intermediate the step 48 and the nose portion 48.

The sleeve 40 and the piston 43 are both constructed from plastic materials and are preferably formed as moldings.

To assemble the back stop the nose portion 48 of the piston 43 is inserted into one end of the bore 41 of the sleeve 40, and the nose portion 48 and the rib 49 are forced through the rib 42 in the sleeve, due to the resilience of the material of the sleeve 40 and the piston 43. This permanently couples together the piston 43 and the sleeve 40 for relative axial sliding movement defined by an engagement of the head 45 with an adjacent end of the sleeve 40, and an engagement between the ribs 49 and 42.

The end of the sleeve 40 against which the head 45 is adapted to abut is formed with a chamfered or reduced diameter portion 50 leading into an external annular groove 51. The diameter of the head 45 is substantially equal to that of the free end of the portion 50 which is in turn less than that of the opening 18 in the back plate 4.

When the sleeve 40 and the piston 43 are coupled together as described above, the back stop is mounted in the opening in the back plate 4 by passing the head 45 through the opening 18 until the edge portion of the back plate 4 surrounding the opening 18 is received in the groove 51.

The piston 43 is then urged inwardly with respect to the sleeve and relative to the brake to increase the effective length of the assembly within the brake until the rib 49 on the piston 43 engages with the rib 42 on the sleeve. Thereafter the adjuster 14 is manipulated to bring the abutment 19 on the lever 9 into engagement with the head 45, and this continues, as described above with reference to the embodiment of FIGS. 5 to 7, until the head engages with the inner end of the sleeve to determine the desired adjusted position of the lever 9 in its first retracted position.

An annular seal or dirt excluding ring 52 surrounds the cylindrical portion 47 of the portions 43 and is in abutment on opposite faces between the rib 49 and the adjacent outer end of the sleeve 40. The seal or ring 52 prevents the igress of dirt or other foreign matter into the sleeve 43 from its outer end and is adapted to deflect when the piston 43 is moved axially into the brake with respect to the sleeve 40.

The construction and operation of the back stop illustrated in FIG. 8 is otherwise the same as that described above with reference to FIGS. 5 to 7 and need not be further described herein.

In the embodiments described above, the openings 12 and 17 are symmetrically arranged in the back plate and so that the position of the cable 11 and the particular insert assembly forming the back stop can be readily interchanged for a drum brake of opposite hand from that illustrated in FIGS. 1 and 2 of the accompanying drawings.

I claim:

1. For an internal shoe drum brake comprising a stationary back plate, first and second arcuate shoes carrying friction linings for engagement with a rotatable drum mounted on said back plate and having at least one pair of adjacent shoe ends, and a mechanical actuator linkage for separating said adjacent shoe ends in the application of the brake, said mechanical actuator linkage comprising an angularly movable lever having first and second opposite ends, a pivotal connection between said first end of said lever and said first shoe, a connection between said second end of said lever and brake applying means, a strut acting at an intermediate point in the length of said lever and said second shoe, and means for adjusting automatically braking clearances between said shoes and said drum, the invention comprising a backstop for holding said angularly movable lever in a first retracted position spaced from a second fully retracted position in which said braking clearances are increased, said back stop comprising an insert assembly adapted to be received in an opening in said back plate and being movable between first and second positions, said assembly having an inner end which in the first position of said assembly is adapted to be engaged normally by said lever to hold the same in its first retracted position, the inner end of said insert assembly being constructed and arranged that in a second position of said assembly the lever is enabled to move to its second fully retracted position, and means externally of said back plate and operatively connected to said insert assembly for effecting movement thereof from its first to its second position.

2. For an internal shoe drum brake comprising a stationary back plate, first and second arcuate shoes carrying friction linings for engagement with a rotatable drum mounted on said back plate and having at least one pair of adjacent shoe ends, and a mechanical actuator linkage for separating said adjacent shoe ends in the application of the brake, said mechanical actuator linkage comprising an angularly movable lever having first and second opposite ends, a pivotal connection between said first end of said lever and said first shoe, a connection between said second end of said lever and brake applying means, a strut acting at an intermediate point in the length of said lever and said second shoe, and means for adjusting automatically braking clearances between said shoes and said drum, the invention comprising a backstop for holding said angularly movable lever in a first retracted position spaced from a second fully retracted position in which said braking clearances are increased, said back stop comprising an insert assembly adapted to be received in an opening in said back plate and having an inner end adapted to be engaged normally by said lever to hold said lever in said first retracted position, the engagement between said lever and said inner end being so constructed and arranged that said lever is movable into said second fully retracted position upon manipulation of said insert assembly externally of said back plate, wherein said insert assembly comprises a cylindrical sleeve of fixed axial length, an end closure at one end of said sleeve normal to the main axis of said sleeve, said sleeve having in the external wall thereof an annular groove adapted to receive a portion of said back plate which surrounds the said opening when said sleeve is in its position of use, said end closure being normally adapted to be engaged by said lever to hold said lever in said first retracted position, and said sleeve being removable from said back plate to permit said lever to move into said second fully retracted position.

3. For an internal shoe drum brake comprising a stationary back plate, first and second arcuate shoes carrying friction linings for engagement with a rotatable drum mounted on said back plate and having at least one pair of adjacent shoe ends, and a mechanical actuator linkage for separating said adjacent shoe ends in the application of the brake, said mechanical actuator linkage comprising an angularly movable lever having first and second opposite ends, a pivotal connection between said first end of said lever and said first shoe, a connection between said second end of said lever and brake applying means, a strut acting in an intermediate point in the length of said lever and said second shoe, and means for adjusting automatically braking clearances between said shoes and said drum, the invention comprising a back stop for holding said angularly movable lever in a first retracted position spaced from a second fully retracted position in which said braking clearances are increased, said back stop comprising an insert assembly adapted to be received in an opening in said back plate and having an inner end adapted to be engaged normally by said lever to hold said lever in said first retracted position, the engagement between said lever and said inner end being so constructed and arranged that said lever is movable into said second fully retracted position upon manipulation of said insert assembly externally of said back plate, wherein said insert assembly comprises a cylindrical sleeve of fixed axial length, an end closure at one end of said sleeve comprising a first portion normal to the main axis of said sleeve and a second portion inclined inwardly with respect to the first, and said sleeve is provided in the external wall thereof with an annular groove adapted to receive a portion of said back plate surrounding said opening when said sleeve is in its position of use, said first portion of said end closure being normally engaged by said lever to hold said lever in said first retracted position, and said sleeve being rotatable in said back plate to bring said second portion into engagement with said lever whereby the effective length of said sleeve within the brake is decreased and said lever is movable into said second fully retracted position.

4. A back stop as claimed in claim 2, wherein said sleeve is constructed from a resilient synthetic plastics material.

5. A back stop as claimed in claim 3, wherein said sleeve is constructed from a resilient synthetic plastic material.

6. For an internal shoe drum brake comprising a stationary back plate, first and second arcuate shoes carrying friction linings for engagement with a rotatable drum mounted on said back plate and having at least one pair of adjacent shoe ends, and a mechanical actuator linkage for separating said adjacent ends in the application of the brake, said mechanical actuator linkage comprising an angularly movable lever having first and second opposite ends, a pivotal connection between said first end of said lever and said first shoe, a connection between said second end of said lever and brake applying means, a strut acting at an intermediate point in the length of said lever and said second shoe, and means for adjusting automatically braking clearances between said shoes and said drum, the invention comprising a back stop for holding said angularly movable lever in a first retracted position spaced from a second fully retracted position in which said braking clearances are increased, said back stop comprising an insert assembly adapted to be received in an opening in said back plate and having an inner end adapted to be engaged normally by said lever to hold said lever in said first retracted position, the engagement between said lever and said inner end being so constructed and arranged that said lever is movable into said second fully retracted position upon manipulation of said insert assembly externally of said back plate, wherein said insert assembly is telescopic and comprises an outer sleeve adapted to be detachable mounted in said opening in said back plate, and a piston working in said outer sleeve and provided at one end with a head of a diameter greater than the internal diameter of said sleeve, said piston being axially movable in said sleeve between a first position in which said head is spaced from an adjacent end of said sleeve and a second position in which said head is in abutment with said adjacent end of said sleeve, said head being normally adapted to be engaged by said lever to hold said lever in said first retracted position, and said assembly is adapted to be removed from said back plate to permit said lever to move into said second fully retracted position.

7. A back stop as claimed in claim 6, wherein said sleeve and said piston are both constructed from resilient synthetic plastic material.

8. In an internal shoe drum brake comprising a stationary back plate, first and second arcuate shoes carrying friction linings for engagement with a rotatable drum mounted on said back plate and having at least one pair of adjacent shoe ends, at least one pull-off spring acting between said shoes to urge said shoes away from said drum, and a mechanical actuator linkage for separating said adjacent shoe ends in the application of said brake, said mechanical actuator linkage comprising an angularly movable lever having first and second opposite ends, a pivotal connection between said first end of said lever and said first shoe, a connection between said second end of said lever and brake applying means, a strut acting between an intermediate point in the length of said lever and said second shoe, and means for adjusting automatically braking clearances between said shoes and said drum, said lever being capable of moving to a fully retracted position so as to afford maximum braking clearance between said shoes and said drum, the invention comprising a back stop for determining said braking clearances in an off position of the brake, said back stop being mounted in said back plate in a first position for engagement with said lever to hold said lever normally in a first partially retracted position spaced from the fully retracted position so as to provide braking clearance less than said maximum clearance, said back stop being constructed and arranged to be movable to a second position enabling said lever to move from its partially retracted position to its fully retracted position under the influence of said pull-off spring, and means external to said back plate for moving said back stop from its first to its second position.

9. In an internal shoe drum brake comprising a stationary back plate, first and second arcuate shoes carrying friction linings for engagement with a rotatable drum mounted on said back plate, and having at least one pair of adjacent shoe ends, at least one pull-off spring acting between said shoes to urge said shoes away from said drum, and a mechanical actuator linkage for separating said adjacent shoe ends in the application of said brake, said mechanical actuator linkage comprising an angularly movable lever having first and second opposite ends, a pivotal connection between said first end of said lever and said first shoe, a connection between said second end of said lever and brake applying means, a strut acting between an intermediate point in the length of said lever and said second shoe, and means for adjusting automatically braking clearances between said shoes and said drum, the invention comprising a back stop for determining said braking clearances in an off position of brake, said back stop being mounted in said back plate for engagement with said lever to hold said lever normally in a first retracted position spaced from a second fully retracted position in which said braking clearances are increased, and said back stop is adapted to be manipulated externally of said back stop whereby said lever is adapted to be moved from said first retracted position into said fully retracted position under the influence of said pull-off spring, wherein said back stop comprises an insert assembly of fixed axial length projecting into the brake through an opening in said back plate in which said insert assembly is removably mounted, and said insert assembly normally engages at its inner end with said angularly movable lever to hold said lever in said first retracted position, and said insert assembly is removable from its mounting in said back plate to permit said lever to move into said second fully retracted position under the influence of said pull-off spring whereby said clearances between said friction linings and said rotatable drum are increased.

10. In an internal shoe drum brake comprising a stationary back plate, first and second arcuate shoes carrying friction linings for engagement with a rotatable drum mounted on said back plate and having at least one pair of adjacent shoe ends, at least one pull-off spring acting between said shoes to urge said shoes away from said drum, and a mechanical actuator linkage for separating said adjacent shoe ends in the application of said brake, said mechanical actuator linkage comprising an angularly movable lever having first and second opposite ends, a pivotal connection between said first end of said lever and said first shoe, a connection between said second end of said lever and brake applying means, a strut acting between an intermediate point in the length of said lever and said second shoe, and means for adjusting automatically braking clearances between said shoes and said drum, the invention comprising a back stop for determining said braking clearances in an off position of brake, said back stop being mounted in said back plate for engagement with said lever to hold said lever normally in a first retracted position spaced from a second fully retracted position in which said braking clearances are increased, and said back stop is adapted to be manipulated externally of said back plate whereby said lever is adapted to be moved from said first retracted position into said fully retracted position under the influence of said pull-off spring, wherein back stop comprises an insert assembly of fixed axial length projecting into said brake through an opening in said back plate in which said insert assembly is mounted, and said insert assembly has an inner end inclined with respect to the axis of said assembly and with which said lever is adapted to engage in the off position of brake, whereby rotation of said insert assembly in the back plate is adapted to alter the effective length of a portion of said assembly within said brake to permit movement of said lever between said first retracted position and said second fully retracted position under the influence of said pull-off spring whereby said clearances between said friction linings and said rotatable drum are increased.

11. In an internal shoe drum brake comprising a stationary back plate, first and second arcuate shoes carrying friction linings for engagement with a rotatable drum mounted on said back plate and having at least one pair of adjacent shoe ends, at least one pull-off spring acting between said shoes to urge said shoes away from said drum, and a mechanical actuator linkage for separating said adjacent shoe ends in the application of said brake, said mechanical actuator linkage comprising an angularly movable lever having first and second opposite ends, a pivotal connection between said first end of said lever and said first shoe, a connection between said second end of said lever and brake applying means, a strut acting between an intermediate point in the length of said lever and said second shoe, and means for adjusting automatically braking clearances between said shoes and said drum, the invention comprising a back stop for determining said braking clearances in an off position of brake, said back stop being mounted in said back plate for engagement with said lever to hold said lever normally in a first retracted position spaced from a second fully retracted position in which said braking clearances are increased, and said back stop is adapted to be manipulated externally of said back plate whereby said lever is adapted to be moved from said first retracted position into said fully retracted position under the influence of said pull-off spring, wherein said back stop comprises a telescopic insert assembly comprising an outer sleeve removably mounted in an opening in said back plate, and a piston working in said sleeve and provided at its inner end for engagement with said lever a head of a diameter greater than the internal diameter of said sleeve, and wherein said head is initially spaced from an adjacent inner end of said sleeve and is movable towards said sleeve during initial adjustment of said mechanical actuator linkage until said head engages with said end of said sleeve to define a desired initial adjustment of said mechanical actuator linkage in which said lever is held in said first retracted position, and said telescopic insert assembly is adapted to be removable from its mounting in said back plate to permit said lever to move into the said second fully retracted position under the influence of said pull-off spring acting between the shoes whereby clearances between said friction linings and said rotatable drum are increased.

12. An internal shoe drum brake as claimed in claim 11, wherein said sleeve is provided with a through bore of constant diameter provided at an intermediate point in its axial length with an inwardly extending rib member, and said piston includes a land of reduced diameter which works in said rib member and which terminates at one end in a nose portion member located at the inner end of said piston, said nose portion member being of a diameter greater than that of said rib member and said nose portion member being forced through said rib member due to the resilience of at least one of said members to provide a coupling between said sleeve and said piston which limits relative axial movement of said head away from said sleeve.

13. An internal shoe drum brake as claimed in claim 12, wherein said land extends between said head and said nose portion member, and an annular rib at an intermediate point in the length of said land works in a portion of said through bore disposed between said inner end of the sleeve and said rib member.

14. An internal shoe drum brake as claimed in claim 12, wherein said land extends between said nose portion member and a shoulder at a step in diameter between said inner end of said land and a large diameter portion terminating at its inner end at said head and working in a portion of said through bore disposed between said inner end of said sleeve and said rib member.

15. An internal shoe drum brake as claimed in claim 14, wherein a radial rib located at an intermediate point in the length of said head is also forced through said rib member to act as a stop limiting axial movement of said head away from said sleeve.

16. An internal shoe drum brake as claimed in claim 15, wherein said nose portion member and said radial rib member each has a portion of maximum diameter, and said maximum diameter portions are of substantially equal diameters.

17. An internal shoe drum brake as claimed in claim 15, wherein a resilient annular member abuts against the free end of said sleeve remote from said head, and said resilient annular member engages at its inner peripheral edge against said land on the side of said radial rib remote from said nose portion member to form a seal between said piston and said bore in said sleeve.

18. An internal shoe drum brake as claimed in claim 11, wherein said head is of a diameter at least smaller than that of said opening through which at least said head and said inner end of said sleeve are inserted into the brake.

19. An internal shoe drum brake as claimed in claim 11 wherein said sleeve and said piston are both constructed from one-piece moldings of synthetic plastic materials.

* * * * *